(12) United States Patent
Ma et al.

(10) Patent No.: US 7,533,018 B2
(45) Date of Patent: *May 12, 2009

(54) TAILORED SPEAKER-INDEPENDENT VOICE RECOGNITION SYSTEM

(75) Inventors: Changxue C. Ma, Barrington, IL (US); Yan M. Cheng, Schaumburg, IL (US)

(73) Assignee: Motorola, Inc., Schaumburg, IL (US)

( * ) Notice: Subject to any disclaimer, the term of this patent is extended or adjusted under 35 U.S.C. 154(b) by 663 days.

This patent is subject to a terminal disclaimer.

(21) Appl. No.: 10/967,957

(22) Filed: Oct. 19, 2004

(65) Prior Publication Data

US 2006/0085186 A1    Apr. 20, 2006

(51) Int. Cl.
*G10L 15/06* (2006.01)
*G10L 15/00* (2006.01)

(52) U.S. Cl. .................. 704/244; 704/243; 704/251; 704/255

(58) Field of Classification Search .............. None
See application file for complete search history.

(56) References Cited

U.S. PATENT DOCUMENTS

| | | | |
|---|---|---|---|
| 5,850,627 A | 12/1998 | Gould et al. | |
| 6,208,964 B1 | 3/2001 | Sabourin | |
| 6,233,553 B1 | 5/2001 | Contolini et al. | |
| 6,243,680 B1 | 6/2001 | Gupta et al. | |
| 6,272,464 B1 | 8/2001 | Kiraz et al. | |
| 6,377,923 B1 | 4/2002 | Hershkovits et al. | |
| 6,434,521 B1 * | 8/2002 | Barnard ................ | 704/244 |
| 6,549,883 B2 | 4/2003 | Fabiani et al. | |
| 6,577,999 B1 | 6/2003 | Lewis et al. | |
| 6,973,427 B2 * | 12/2005 | Hwang et al. ............. | 704/249 |
| 2002/0091511 A1 | 7/2002 | Hellwig et al. | |
| 2002/0091526 A1 | 7/2002 | Kiessling et al. | |
| 2004/0148172 A1 | 7/2004 | Cohen et al. | |
| 2006/0143008 A1 * | 6/2006 | Schneider et al. ......... | 704/251 |

OTHER PUBLICATIONS

Strik, H. "Pronunciation adaptation at the lexical level" A2RT Dept. of Language and Speech, University of Nijmegen, the Netherlands, pp. 123-130 2001.*

Kessens, J. et al. "A data-driven method for modeling pronunciation variation", Speech Communication pp. 517-534 2003.*

Eichner, M. et al. "Data-driven generation of pronunciation dictionaries in the german verbmobil project—discussion of experimental results", Dresden University of Technology, pp. 1687-1690 2000.*

(Continued)

*Primary Examiner*—David R Hudspeth
*Assistant Examiner*—Matthew J. Sked
(74) *Attorney, Agent, or Firm*—Sylvia Chen

(57) ABSTRACT

A tailored speaker-independent voice recognition system has a speech recognition dictionary (360) with at least one word (371). That word (371) has at least two transcriptions (373), each transcription (373) having a probability factor (375) and an indicator (377) of whether the transcription is active. When a speech utterance is received (510), the voice recognition system determines (520, 530) the word signified by the speech utterance, evaluates (540) the speech utterance against the transcriptions of the correct word, updates (550) the probability factors for each transcription, and inactivates (570) any transcription that has an updated probability factor that is less than a threshold.

17 Claims, 5 Drawing Sheets

OTHER PUBLICATIONS

Houda Mokbel, D. Jouvet; "Derivation of the Optimal Set of Phonetic Transcripts for a Word from its Acoustic Realizations;" Speech Communication, Sep. 1999; pp. 49-64, vol. 29, No. 1, Elsevier Science Publishers, Amsterdam, NL.

Voicesignal Technologies; "Using The Voice Features Of The Samsung® i700", Version 1.2.14; Feb. 2004.

Daniel Willett, Erik McDermott, Shigeru Katagiri; "Unsupervised Pronunciation Adaptation For Off-Line Transcription Of Japanese Lecture Speeches"; 2002.

Chuck Wooters, Andreas Stolcke; "Multiple-Pronunciation Lexical Modeling In A Speaker Independent Speech Understanding System"; 1994.

Sabine Deligne, Benoit Maison, Ramesh Gopinath; "Automatic Generation And Selection Of Multiple Pronunciations For Dyanmic Vocabularies"; IBM T.J. Watson Research Center.

MIT; "Introduction To Automatic Speech Recognition"; Lecture #1, Session 2003; Aug. 8, 2003.

* cited by examiner

-PRIOR ART-

SPEECH RECOGNITION DICTIONARY 360

| WORD 371 | TRANSCRIPTION 373 | | PROBABILITY 375 | ACTIVE? 377 |
|---|---|---|---|---|
| BOB | [bob] | 381 | .795 | YES |
| BOB | [bop] | 382 | .207 | YES |
| BOB | [bo-h] | 383 | .008 | NO |
| WITTE | [wit-eh] | 391 | 0 | YES |
| WITTE | [wit] | 392 | 0 | YES |
| WITTE | [white] | 393 | 0 | YES |
| WITTE | [wit-tee] | 394 | 0 | YES |
| WITTE | [white-ee] | 395 | 0 | YES |
| WITTE | [vit-eh] | 396 | 0 | YES |
| WITTE | [vit-ee] | 397 | 0 | YES |

380 { rows for BOB }
390 { rows for WITTE }

PHONEBOOK
357 —
WITTE BOB
H: 800-555-1212
O: 800-123-4567
M: 800-765-4321

*FIG. 3*

TAILORED SPEAKER-INDEPENDENT VOICE RECOGNITION SYSTEM

FIELD OF THE DISCLOSURE

This disclosure relates generally to speaker-independent voice recognition systems.

BACKGROUND OF THE DISCLOSURE

There are two main approaches to voice recognition: speaker-dependent and speaker-independent. Speaker-depending systems are common in personal electronic devices such as cellular telephones. Speaker-dependent systems use a training mode to capture phonetic waveforms of a single speaker. These phonetic waveforms are evaluated, processed, and matched to words in a speech recognition dictionary in the form of a sequence of waveform parameters. The result is a voice recognition system that is unique to the single speaker; a speaker-dependent voice recognition will not work well for someone other than that single speaker. Speaker-dependent voice recognition systems are sensitive and, although they have very high accuracy rates under ideal conditions, they are adversely affected by background noise, coughing, a strained voice, etc. Another drawback to a speaker-dependent voice recognition system is that words that do not follow standard pronunciation rules, such as proper names, must be individually trained—in addition to the standard training mode.

On the other hand, speaker-independent voice recognition systems are common in dictation systems, automated directory assistance, automated phone banking, and voice-command devices. Speaker-independent systems use dictionaries with transcriptions created by professional linguists to match a particular speech utterance to a word. Because recognition is based on transcriptions rather than waveforms, speaker-independent voice recognition systems have a slightly lower accuracy rate than speaker-dependent systems. Speaker-independent voice recognition systems, however, are generally more robust than speaker-dependent voice recognition systems, can recognize the same word even when spoken by different speakers, and can more accurately recognize speech utterances in the presence of background noise.

Each word in a speaker-independent voice recognition system has at least one transcription, and sophisticated speaker-independent voice recognition systems use multiple-pronunciation models to account for alternate pronunciations of words. For example, U.S. dictionaries acknowledge the two common pronunciations of the word "Caribbean" as "kăr'□-b ē'□n" or "k□-rĭb'ē-□n." These two pronunciations can be mapped to two transcriptions in the dictionary in a speaker-independent voice recognition system. Not only can multiple-pronunciation models account for standard single-language pronunciation alternates, but some multiple-pronunciation models also account for non-native accents, regional dialects, and personalized vocabularies. For personalized vocabularies such as proper names which do not follow standard pronunciation rules, a multiple-pronunciation generation model can automatically produce many alternate transcriptions. Thus, to increase of the coverage, there can be up to a dozen speaker-independent transcriptions for a single word in a multiple-pronunciation model environment.

A drawback to speaker-independent voice recognition systems with multiple-pronunciation models is that more transcriptions requires more memory and more processing power to recognize a particular speech utterance. In a portable electronic device, a speaker-independent voice recognition system with multiple-pronunciation models can use considerable processing power which can translate into battery drain and/or a noticeable lag in recognition speed. Moreover, this also can lead to an increase in confusion between words in the speech recognition dictionary.

Thus, there is an opportunity to move speaker-independent voice-recognition systems from a centralized system, such as an automated directory assistance system, to an individualized system such as in a portable electronic device. There is also an opportunity to improve upon speaker-independent voice recognition systems with multiple-pronunciation models to increase the speed of recognition and reduce processing requirements, especially for proper names, while maintaining the benefits of robust voice recognition capabilities. The various aspects, features and advantages of the disclosure will become more fully apparent to those having ordinary skill in the art upon careful consideration of the following Drawings and accompanying Detailed Description.

BRIEF DESCRIPTION OF THE DRAWINGS

FIG. 3 shows details of a voice recognition dictionary and an electronic phonebook in the portable electronic device of FIG. 2.

DETAILED DESCRIPTION OF THE PREFERRED EMBODIMENTS

A tailored speaker-independent voice recognition system has a speech recognition dictionary with at least one word. That word has at least two transcriptions, each transcription having a probability factor and an indicator of whether the transcription is active. When a speech utterance is received, the voice recognition system determines the word signified by the speech utterance, evaluates the speech utterance against the transcriptions of the correct word, updates the probability factors for each transcription, and inactivates any transcription that has an updated probability factor that is less than a threshold.

Figure 1:
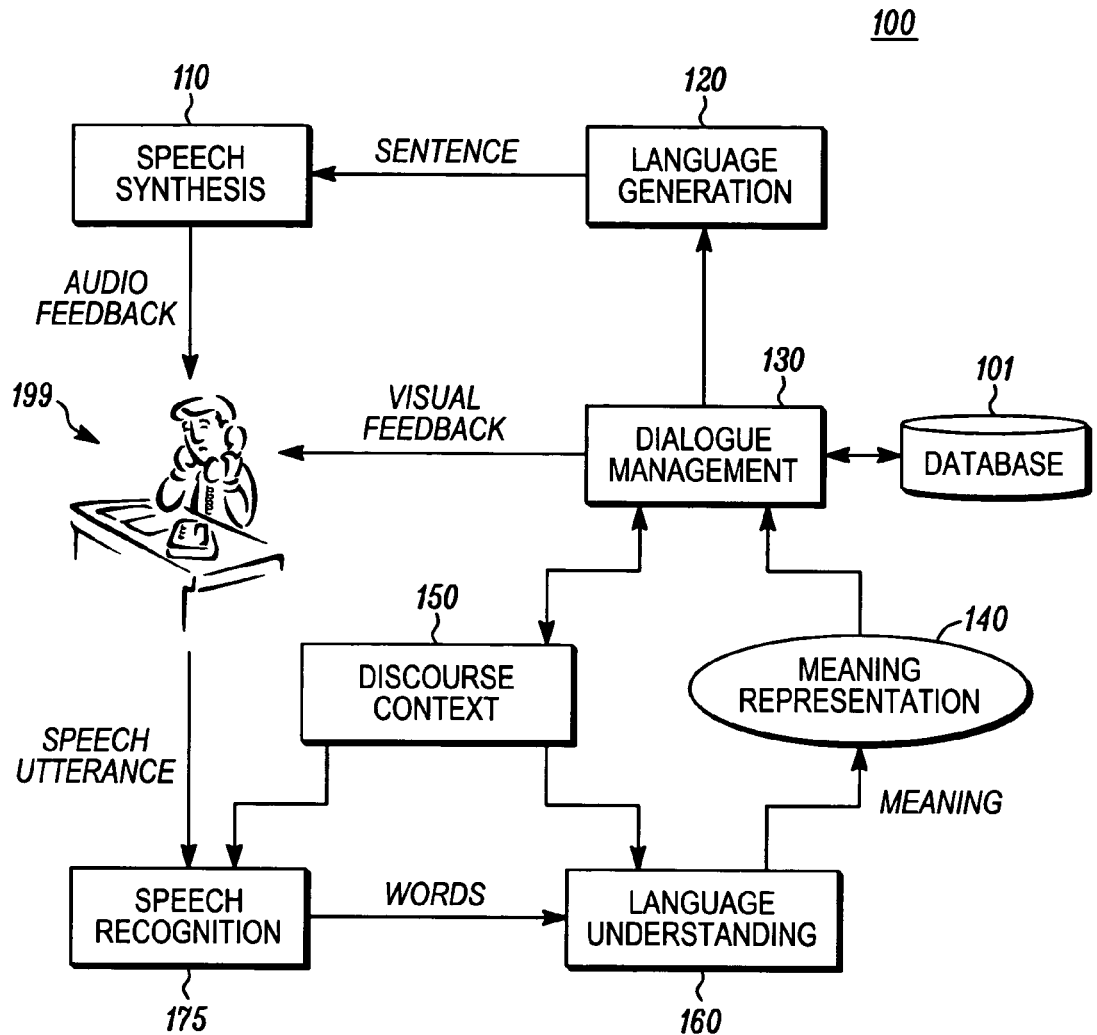
FIG. 1 shows a prior art diagram of a speaker-independent voice recognition system.

As background, FIG. 1 shows a prior art diagram of a speaker-independent voice recognition system 100. This system is a dialogue system that evaluates utterances that represent either single words or groups of words. A user 199 speaks, and speech utterances are received by a speech recognition engine 175. The discourse context engine 150 assists in speech recognition by parsing words from the speech utterance according to predetermined grammar strings. For example, the discourse context engine 150 has a grammar string of "Call $PHONEBOOK at (home|office|mobile)." Then, a speech utterance of "Call Bob at home" can be parsed into words by the speech recognition engine 175.

These words are passed to a language understanding block 160 that interprets meanings from the words. Again, with the help of the discourse context engine 150, the system can understand these words having a meaning representing a valid instruction that the system can act upon. The meaning is set to a meaning representation block 140, which transforms the meaning into a predefined structure that is actionable by the dialogue management block 130. For example, "Call Bob at home" is transformed into an action "call," a phonebook entry "Bob," and a related home phone number "800-555-1212."

The dialogue management block 130 interacts with a database 101 to present audio and/or visual feedback to the user 199 complying with the meaning of the speech utterance as understood by the system. For example, visual feedback could be a display notice stating "Calling Bob at 800-555-1212 (home)." The dialogue management block 130 can also provide audio feedback through a language generation block 120, which creates a sentence responsive to the speech utterance as understood by the system. Such a sentence could be "Calling Bob at home." This sentence is passed to a speech synthesis block 110, which produces audio feedback to the user 199.

Such a speaker-independent dialogue system 100 allows for coherent speech recognition of words, phrases, instructions, and other grammar strings. It also provides a mechanism for a user to verify correctly recognized speech utterances and fix any incorrectly recognized speech utterances. In such a speaker-independent system, the speech recognition has many transcriptions for each word, which allows for recognition of many speech utterances of the same word.

Figure 2:
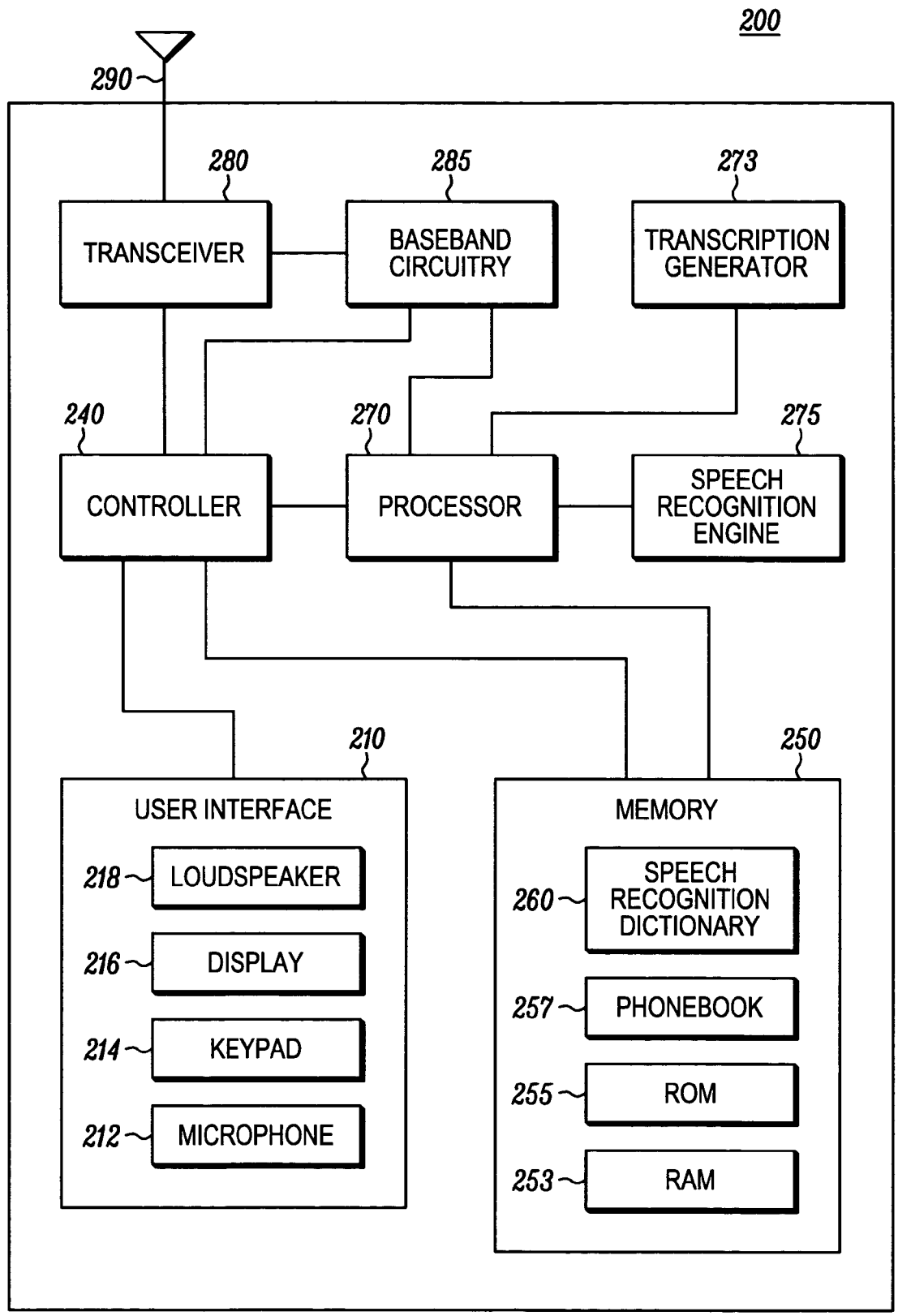
FIG. 2 shows a simplified block diagram of a portable electronic device with a tailored speaker-independent voice recognition system according to a first embodiment.

FIG. 2 shows a simplified block diagram of a portable electronic device 200 with a tailored speaker-independent voice recognition system according to a first embodiment. In this first embodiment, the portable electronic device 200 is shown as a cellular telephone. The tailored speaker-independent voice recognition system can be implemented in any device that presently uses a speaker-dependent voice recognition system. These devices include personal computers, voice command devices for the disabled, personal digital assistant devices, and cellular telephones. Using a tailored speaker-independent voice recognition system avoids the training mode of a speaker-dependent voice recognition system but allows the speed and accuracy of speech recognition to increase through modification of the speech recognition dictionary 260.

In this first embodiment, the portable electronic device 200 includes an antenna 290 for receiving radiofrequency signals, a transceiver 280, and baseband circuitry 285. A main controller 240 controls the general functions of the electronic device 200. The controller 240 operates in response to stored programs of instructions to demodulate received radiofrequency signals and modulate baseband signals received from the user interface 210. The user interface 210 includes elements such as a loudspeaker 218, a display 216, a keypad 214, and a microphone 212.

A speech recognition processor 270 couples to a transcription generator 273, a speech recognition engine 275, and memory 250 that includes a speech recognition dictionary 260, an electronic phonebook 257, and other read-only memory 255 and random access memory 253. The speech recognition dictionary 260 and electronic phonebook 257 will be described in more detail in conjunction with FIG. 3.

During operation of a tailored speaker-independent voice recognition system in the electronic device 200, a user speaks a command into the microphone 212, which captures the sound as a speech utterance. The controller 240 passes the speech utterance to the processor 270, which uses the speech recognition engine 275 and the speech recognition dictionary 260 to identify a word meant by the speech utterance. The word is passed to the controller 240 for presentation on the display 216 as visual feedback to the user and/or announcement on the loudspeaker 218 as audio feedback to the user.

Speech recognition dictionary 260 words can be pre-loaded before the user receives the electronic device 200. Pre-loaded words would be commands such as "Call," "Home," "Office," "Mobile," and the numbers 0 through 9. Additionally or alternately, a user can add words to the speech recognition dictionary 260 by adding entries to the electronic phonebook 257, by creating user commands, or by creating "canned" short messages. The proper names in the electronic phonebook 257 are loaded into the speech recognition dictionary 260 as words.

FIG. 3 shows details of a voice recognition dictionary 360 and an electronic phonebook 357 in the portable electronic device 200 of FIG. 2. A portion of the memory block 250 shown in FIG. 2 is shown as block 350 in FIG. 3. A speech recognition dictionary 360 includes records of words 371, related transcriptions 373, probability factors 375, and indicators 377 of whether the record is active or inactive. Shown in FIG. 3 are two words, BOB and WITTE, which are found in the electronic phonebook 357. Each word has more than one transcription, which reflects the various ways that the word can be recognized by the speech recognition engine 275 shown in FIG. 2. These transcriptions can be pre-loaded into the speech recognition dictionary 360 or can be automatically generated by the transcription generator 273 shown in FIG. 2.

Pre-loaded transcriptions are more likely for words that are related to voice commands for the electronic device or are common words useful for users of the electronic device. For examples, pre-loaded multiple transcriptions for words such as "Call," "Home," "Office," "Mobile," and the numbers 0 through 9 would be beneficial. Multiple transcriptions can also be pre-loaded for words common to particular applications of the electronic device. For example, in a personal computer, transcriptions for commands such as "Launch Word Processor," "Launch Email," and "Launch Spreadsheet" can be pre-loaded into a speech recognition dictionary. For a voice-controlled television controller, commands such as "Volume Up," "Volume Down," "Mute," "Channel Up," "Channel Down" would also be logical to pre-load into a speech recognition dictionary.

In this first embodiment, additional words are received from proper name entries in the electronic phonebook 357. The electronic phonebook 357 contains one entry with the proper name "Witte Bob" having a given name "Bob" and a surname "Witte." In this first embodiment, the given name BOB 380 is separated from the surname WITTE 390 in the speech recognition dictionary 360. In a dialogue system such as that shown in FIG. 1, where the portable electronic device responds audibly or visually or both, the response seeks to verify the user's intention. For example, if a user says "Bob," and BOB is not unique in the electronic phonebook 357, the portable electronic device responds with a question such as "Do you want to call Bob Witte or Bob Chen?" or "There is more than one 'Bob' in the phonebook. Please say the full name." Alternate embodiments may include the entire name "Witte Bob" (or "Bob Witte") as a single word.

The word BOB 380 has three transcriptions 381, 382, 383 as created by the automatic transcription generator 273 shown in FIG. 2. Each of these transcriptions is associated with a particular probability, which is re-evaluated whenever the word "Bob" is correctly identified from a speech utterance. Each of these transcriptions also has a flag which indicates whether that transcription is active. An inactive transcription is not considered by the speech recognition engine 275 shown in FIG. 2 when a speech utterance is being evaluated for recognition.

The word WITTE 390 has seven transcriptions 391, 392, 393, 394, 395, 396, 397 as created by the automatic transcription generator 273 shown in FIG. 2. Note that, because WITTE 390 is a more difficult word to determine due to multiple likely pronunciations, there are many more transcriptions. The probability of 0 associated with each transcription of WITTE 390 indicates that the word "Witte" has not yet been correctly identified from a speech utterance. Each transcription of WITTE 390 is active for consideration by the speech recognition engine 275 shown in FIG. 2 and thus eligible for a potential match to a speech utterance.

By using a series of voice commands, such as "Call," "Home," the electronic device 200 shown in FIG. 2 can be directed to call the "home" telephone number associated with electronic phonebook entry "Witte Bob." Command words, such as "CALL," "HOME," "OFFICE," and "MOBILE," are not shown in FIG. 3 for the sake of clarity. Instead, we concentrate on the proper names, which can have more transcriptions and more varied transcriptions.

Figure 4:
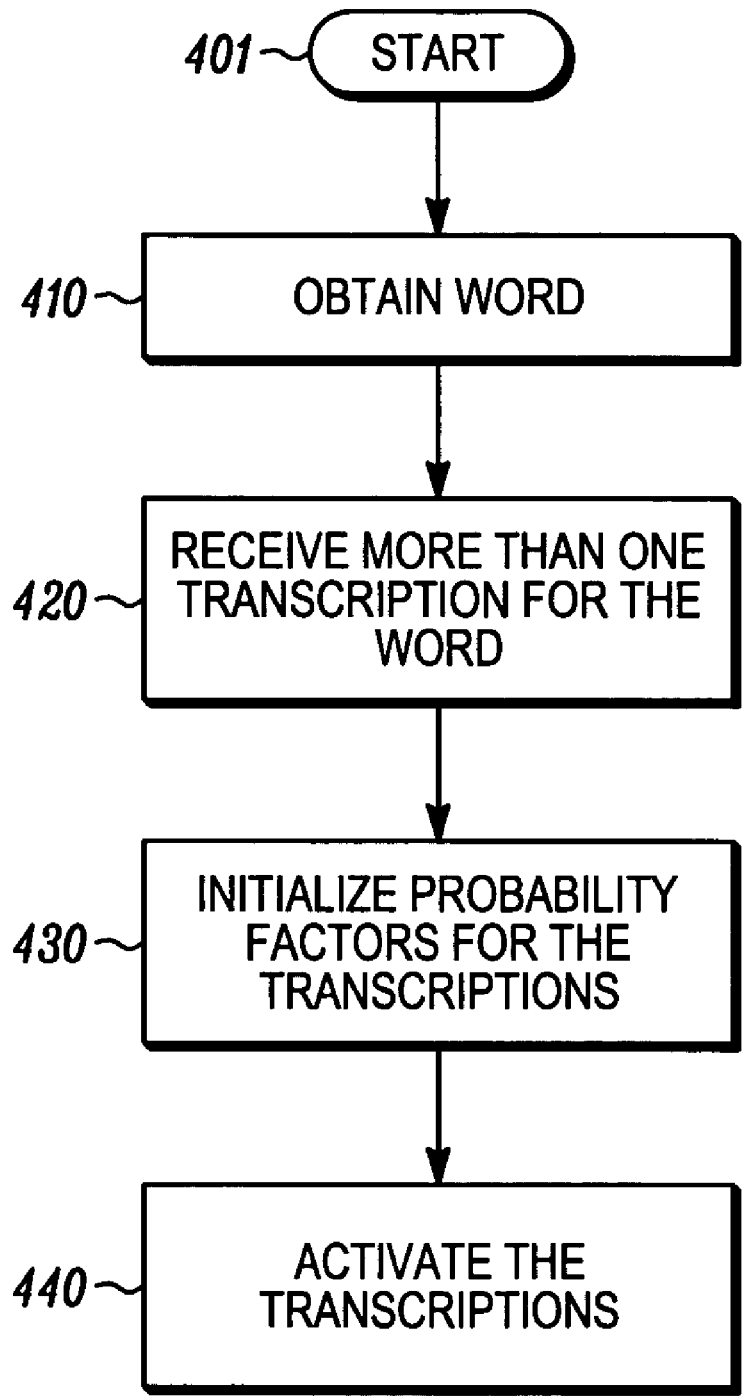
FIG. 4 shows a flowchart for entering words into a speech recognition dictionary according to the first embodiment.

FIG. 4 shows a flowchart 400 for entering words into a speech recognition dictionary according to the first embodiment. The flowchart starts in step 401, and a speech recognition dictionary 260 shown in FIG. 2 obtains a word in step 410. The word can be obtained through a pre-loading process for command words such as "Call," "Home," "Office," "Mobile," or common words such as the numbers 0 through 9, or a word can be obtained through an interface with an electronic phonebook 257 shown in FIG. 2.

Step 420 receives more than one transcription for the word. A transcription generator 273 shown in FIG. 2 can automatically create such transcriptions. Multiple automatic transcriptions can be created from the word by taking into account factors such as accents, dialects, and letter-to-sound rules. Multiple transcriptions can also be created by professional linguists, as common in speaker-independent systems, and then loaded into the speech recognition dictionary 260 shown in FIG. 2 before the electronic device 200 is delivered to a user. Step 430 initializes the probability factor for each of these newly-created transcriptions to 0. Each of these newly-created transcriptions is flagged as "active" in step 440 even though its probability factor is 0. See the seven WITTE 390 records shown in FIG. 3. At this point, the newly-created multiple transcriptions are available for use by the speech recognition engine 275 shown in FIG. 2.

Figure 5:
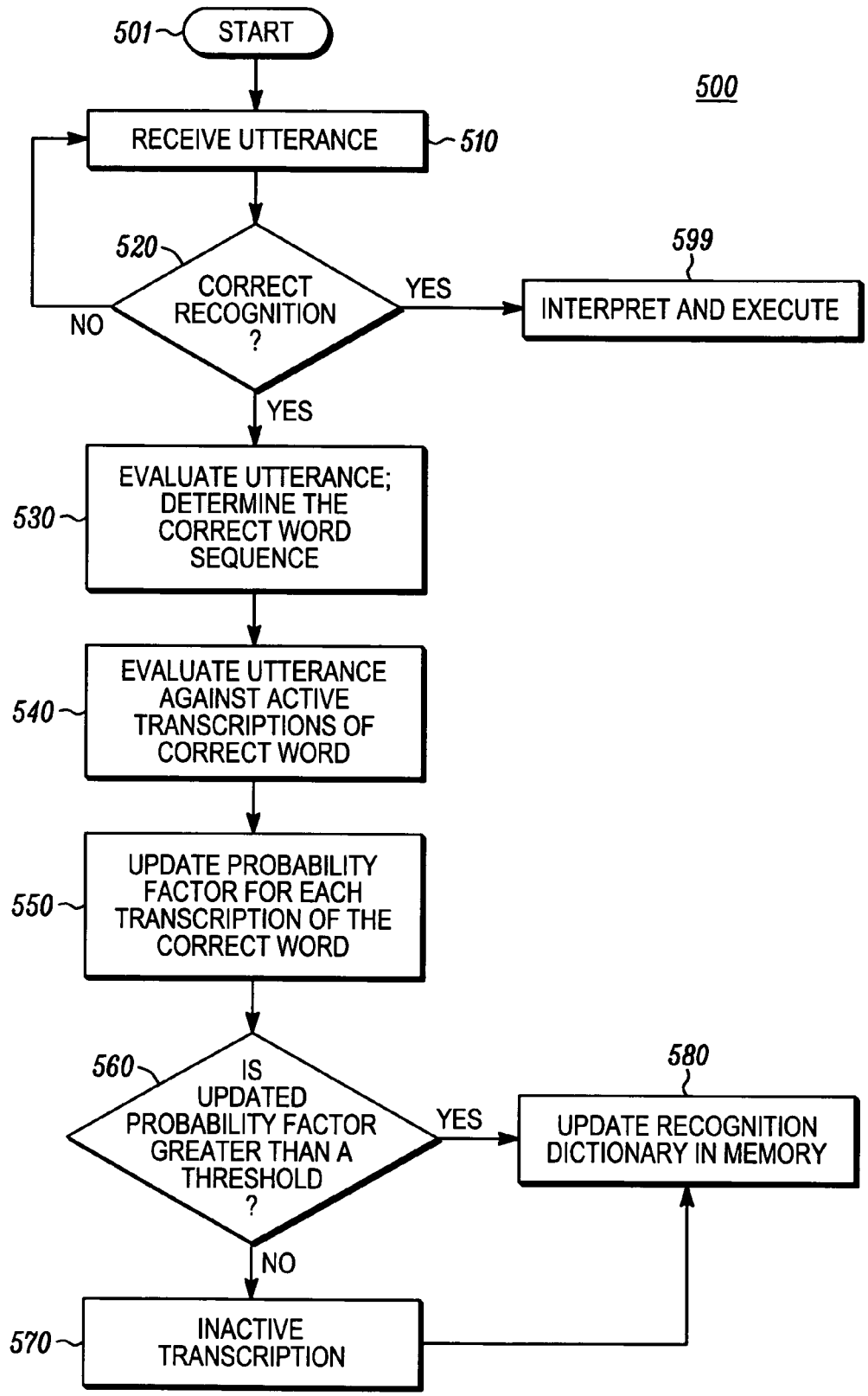
FIG. 5 shows a flowchart for recognizing speech utterances and updating transcriptions according to the first embodiment.

FIG. 5 shows a flowchart 500 for recognizing speech utterances and updating transcriptions according to the first embodiment. This embodiment uses an electronic device in a dialogue system, such as that shown in FIG. 1. After start step 501, a speech utterance is received in step 510. For the electronic device 200 shown in FIG. 2, the speech utterance is received through the microphone 212 of the user interface 210. Step 520 evaluates whether the speech recognition engine has determined a correct recognition, which could be a word or sequence of words. In this embodiment, a dialogue occurs to verify the recognized word(s) using audio feedback from a loudspeaker 218 and/or visual feedback from a display 216 such as those shown in FIG. 2. For example, if the speech recognition engine matches more than one word to a speech utterance, the electronic device 200 can state the most likely word(s) through the loudspeaker 218 and/or display the most likely word(s) on the display 216. If the recognition is incorrect, the flow returns to step 510 to receive another utterance—most likely an attempt to repeat the previous utterance.

If the recognition is correct, step 599 interprets the recognized words and executes the proper action related to the recognized words. Meanwhile, step 530 evaluates the utterance to determine the correct word sequence. It is possible to reverse the order of step 520 and step 530 so that a word sequence is determined before a correct recognition is verified. Either way, after words are correctly identified from the speech utterance, step 540 evaluates correct words against active transcriptions. There are many ways to optimize this evaluation process, including Viterbi decoding and Burm-Welch decoding. Any of these methods can be implemented by step 540.

Once the correct word is determined, step 550 updates the probability factor for each transcription of the correct word. Transcriptions for other words are unaffected. In this embodiment, an acoustic score for each active transcription is accumulated through usage a predetermined number of times. The probability for each active transcription is calculated by dividing the accumulated acoustic score for each transcription with the total accumulated acoustic score for all the transcriptions of that word. Note that an acoustic score is a probability for a transcription in the logarithmic domain, so the probability for a transcription can be easily calculated by first transforming an acoustic score back to the probability domain.

Step 560 determines if the updated probability factor is greater than a threshold. The threshold can be pre-set or can be dynamically adjusted. For example, a pre-set threshold can be at 0.100. Alternately, a dynamically adjusted threshold can be equivalent to, for example, one-half the highest probability transcription for that word or, for example, the third highest probability transcription for that word. Generally speaking, a dynamically adjusted threshold could be equivalent to a predetermined fraction of the highest probability factor for that word or, alternately, equivalent to the x-th highest probability factor for that word. If the updated probability factor for a particular transcription is less than the threshold, step 570 inactivates that transcription before updating the recognition dictionary in memory in step 580. If the updated probability factor for a particular transcription is greater than (or equal to) the threshold, step 580 updates the recognition dictionary in memory with the updated probability factor for the still-active transcription. Inactivating transcriptions that are less than a threshold allows the speech recognition engine to skip evaluations against those transcriptions that are not likely to match speech utterances.

Following is a simple, non-dialogue example of the tailored speaker-independent voice recognition system as used in the first embodiment for recognizing the speech utterance for WITTE. After the proper name "Witte Bob" is entered into the electronic phonebook 357 shown in FIG. 3, the flowchart 400 shown in FIG. 4 obtains the word "WITTE" in step 410 and creates more than one transcription in step 420. The seven example transcriptions are shown as the WITTE 390 entries in FIG. 3. Normal letter-to-sound rules for the word "WITTE" result in transcriptions 391, 392, 393, 393, 395 while accent rules result in transcriptions 396, 397. Step 430 initializes the probability factor for each of the seven WITTE 390 transcriptions to 0. Step 440 in FIG. 4 sets the indicator for each of the transcriptions 391, 392, 393, 394, 395, 396, 397 to active.

Now, when a user of the electronic device 200 shown in FIG. 2 is using automatic speech recognition of a name to dial a telephone number, the microphone 212 captures a speech utterance such as "wit-ee." This is reflected in steps 501 and 510 of FIG. 5. A speech recognition engine 275 shown in FIG. 2 evalutes the speech utterance "wit-ee" against the numerous active transcriptions in the speech recognition dictionary 360 shown in FIG. 3. Given that the only close matches are within the WITTE 390 records, the speech recognition engine 275 proposes that the correct word is "WITTE" and verifies it in step 520 and step 530. In step 540, the speech utterance is evaluated against all the active transcriptions for the correct word "WITTE." The probability factors for each of the seven WITTE 390 transcriptions are updated in step 550 to a non-zero number based on the correctly identified speech utterance. For certain transcriptions 393, 395, the updated probability factors will be below a threshold and thus inactivated in step 570 of FIG. 5. Then, the next time that a user desires to name dial "Witte," the speech recognition engine will have two fewer transcriptions to evaluate, which can result in faster recognition, more accurate recognition, and less power drain.

A tailored speaker-independent voice recognition system can be used not only for proper names, but it can also be used for voice commands of the electronic device and for digit dialing. A speech recognition dictionary for digit dialing can include multiple transcriptions for each of the numbers 0 through 9. As described earlier, the probability factors for these transcriptions can be updated whenever a word (number) is correctly identified. Thus, the speaker-independent transcriptions for numbers can be tailored to a particular speaker's accent, dialect, and whether he or she is a non-native speaker.

A tailored speaker-independent voice recognition system has the benefits of working without a training mode, recognizing multiple speakers with different accents and dialects, and gradually tailoring its transcriptions to inactivate transcriptions with a low probability and thus increasing the speed to recognize a speech utterance and improve the recognition performance for the user. The tailored speaker-independent voice recognition system recognizes proper names and other words without individual training. The system receives multiple transcriptions of words and then "prunes" those transcriptions that do not accurately represent how the user actually says the word.

A side benefit to the tailored speaker-independent voice recognition system is that, in many instances, it will successfully recognize speech utterances from others with similar accents and dialects (e.g., a family member of the user).

While this disclosure includes what are considered presently to be the preferred embodiments and best modes of the invention described in a manner that establishes possession thereof by the inventors and that enables those of ordinary skill in the art to make and use the invention, it will be understood and appreciated that there are many equivalents to the preferred embodiments disclosed herein and that modifications and variations may be made without departing from the scope and spirit of the invention, which are to be limited not by the preferred embodiments but by the appended claims, including any amendments made during the pendency of this application and all equivalents of those claims as issued.

It is further understood that the use of relational terms such as first and second, top and bottom, and the like, if any, are used solely to distinguish one from another entity, item, or action without necessarily requiring or implying any actual such relationship or order between such entities, items or actions. Much of the inventive functionality and many of the inventive principles are best implemented with or in software programs or instructions. It is expected that one of ordinary skill, notwithstanding possibly significant effort and many design choices motivated by, for example, available time, current technology, and economic considerations, when guided by the concepts and principles disclosed herein will be readily capable of generating such software instructions and programs with minimal experimentation. Therefore, further discussion of such software, if any, will be limited in the interest of brevity and minimization of any risk of obscuring the principles and concepts according to the present invention.

We claim:

1. An electronic device comprising:
   a memory for storing a word, a first transcription of the word, and a second transcription of the word;
   a microphone for capturing a speech utterance;
   a speech recognition engine, coupled to the microphone and the memory, for evaluating through a predetermined number of times of speech utterances against the first transcription and the second transcription, for determining a first probability factor for the first transcription based on an accumulated acoustic score for the first transcription and a total accumulated score of the first transcription and the second transcription, and for determining a second probability factor for the second transcription based on an accumulated acoustic score for the second transcription and the total accumulated score of the first transcription and the second transcription; and
   a processor, coupled to the speech recognition engine, for inactivating the first transcription if the first probability factor is below a threshold.

2. An electronic device according to claim 1 further comprising:
   a transcription generator, coupled to the processor, for automatically generating the first transcription.

3. An electronic device according to claim 2 wherein the transcription generator automatically generates the second transcription.

4. An electronic device according to claim 1 further comprising:
   a display, coupled to the processor, for displaying the word.

5. An electronic device according to claim 1 further comprising:
   a loudspeaker, coupled to the processor, for announcing the word.

6. An electronic device according to claim 1 wherein the memory further comprises:
   a speech recognition dictionary for storing the word, the first transcription, the second transcription, the first probability factor, and the second probability factor.

7. An electronic device according to claim 6 wherein the memory further comprises:
   a first transcription "active" indicator and a second transcription"active" indicator.

8. An electronic device according to claim 1 wherein the memory further comprises:
   an electronic phonebook.

9. An electronic device according to claim 1 wherein the threshold is a predetermined value.

10. An electronic device according to claim 1 wherein the threshold is a dynamically-determined value.

11. An electronic device according to claim 10 wherein the threshold is a value equivalent to an x-th highest probability factor for the word.

12. An electronic device according to claim 10 wherein the threshold is a value equivalent to a predetermined fraction of a highest probability factor for the word.

13. A method for recognizing a speech utterance comprising the steps of:
   obtaining a word;
   receiving a first transcription for the word;
   receiving a second transcription for the word;
   initializing a first probability factor for the first transcription;
   initializing a second probability factor for the second transcription;
   activating the first transcription;
   activating the second transcription;

receiving speech utterances;
determining the word signified by the speech utterances;
evaluating through a predetermined number of times the speech utterances against the first transcription;
evaluating through a predetermined number of times the speech utterances against the second transcription;
updating the first probability factor based on an accumulated acoustic score for the first transcription and a total accumulated score of the first transcription and the second transcription;
updating the second probability factor based on an accumulated acoustic score for the second transcription and the total accumulated score of the first transcription and the second transcription; and inactivating the first transcription if the updated first probability factor is less than a threshold.

14. A method according to claim 13 wherein the threshold is a predetermined value.

15. A method according to claim 13 wherein the threshold is a dynamically determined value.

16. A method according to claim 13 wherein the step of receiving the first transcription comprises:
automatically creating the first transcription from the word.

17. A method according to claim 13 wherein the step of receiving the first transcription comprises:
storing the first transcription for the word in a memory.

* * * * *